Dec. 10, 1968  A. GREENFIELD  3,415,481
REAR VIEW MIRROR ATTACHMENT
Filed Feb. 14, 1967  2 Sheets-Sheet 1
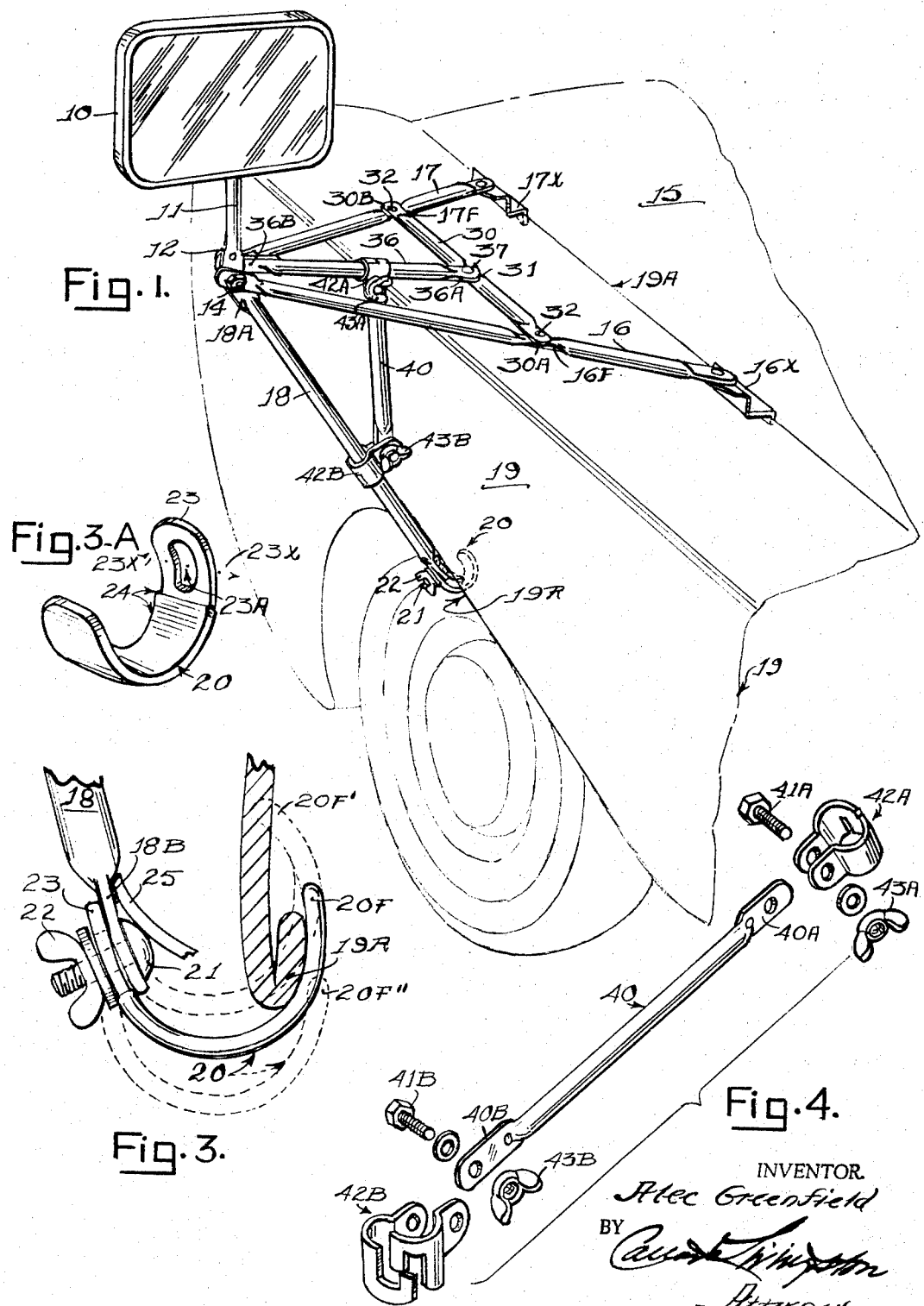
INVENTOR.
Alec Greenfield
BY
Attorney Dec. 10, 1968    A. GREENFIELD    3,415,481
REAR VIEW MIRROR ATTACHMENT
Filed Feb. 14, 1967    2 Sheets-Sheet 2
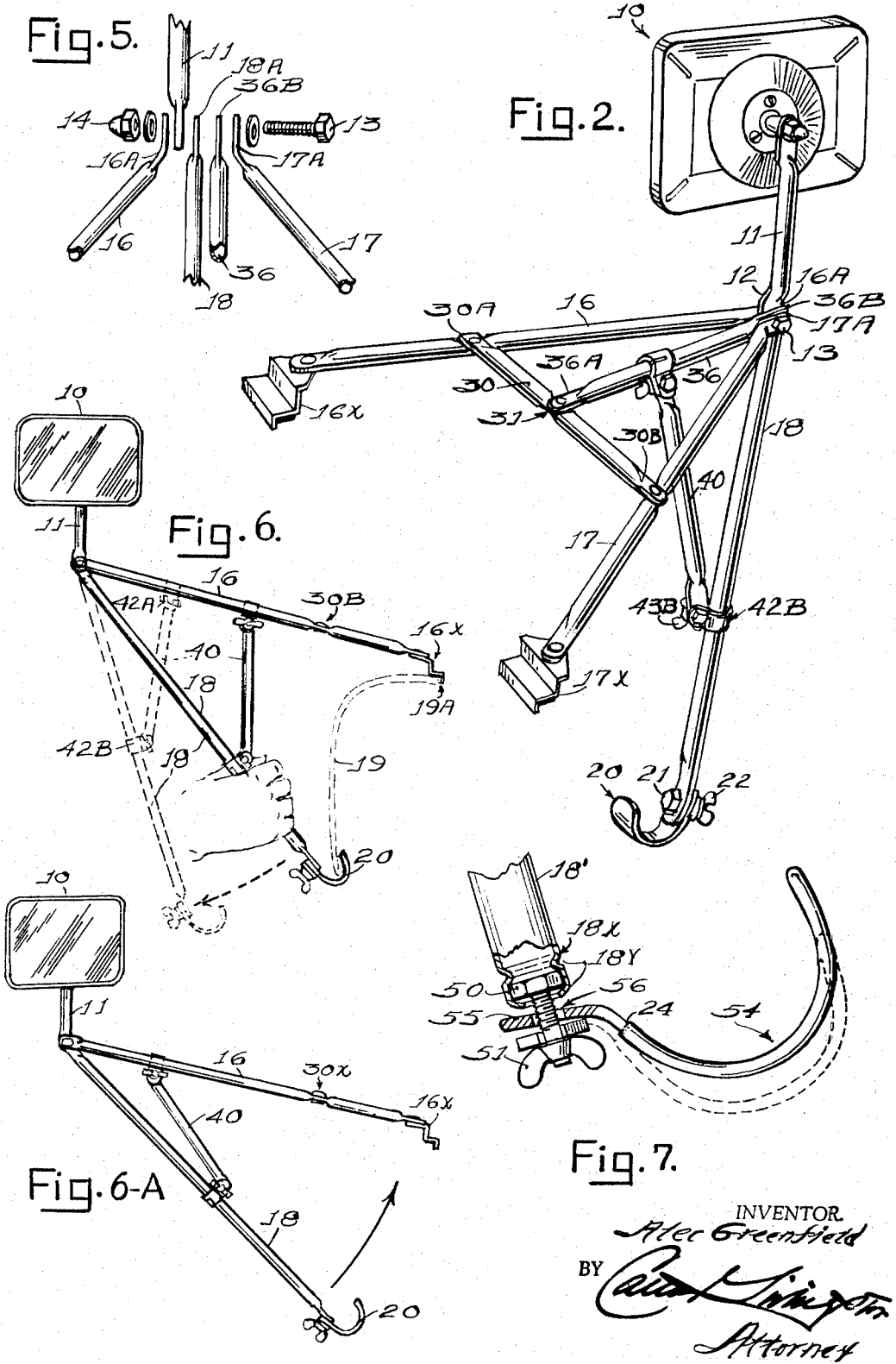
INVENTOR.
Alec Greenfield
BY
Attorney

United States Patent Office 3,415,481
Patented Dec. 10, 1968

3,415,481
REAR VIEW MIRROR ATTACHMENT
Alec Greenfield, Chicago, Ill., assignor to The Greenfield Company, Grove Village, Ill., a corporation of Illinois
Filed Feb. 14, 1967, Ser. No. 616,123
7 Claims. (Cl. 248—486)

ABSTRACT OF THE DISCLOSURE

The invention relates to rearview mirrors of the detachable type employing an outboard mirror-supporting structure of a known form comprising three legs arranged in a tripodal array in which one leg is pivotable at the common apex conjunction of the three, and the other two legs are relatively fixed, the free ends of all three legs being equipped with claw or hook means adapted to engage marginal portions of the automobile hood and wheel opening in the fender skirt, and some form of diagonal brace, preferably adjustable, is applied in some manner between the two fixed legs and the pivotable leg, the disclosed improvements being characterized in that they are directed to a combination bracing and adjusting structure affording a slideway for a diagonal adjusting and clamping link interconnecting with the third leg, the link being shiftable along the slideway in a direction which is toward and away from the tripod conjunction of the three legs and therefore in a direction which is substantially at right angles toward and away from the side of the fender skirt, whereby the positioning of the third leg in adjustment to the fender skirt is facilitated, the adjusting range is increased, and the rigidity of the structure is significantly improved.

---

Examples of mirror supporting structures of the type described are found in the following U.S. Patents: 2,898,070, De Vaan; 3,114,530, Shilling; 3,119,591, Malecki; 3,142,469, Clemmer; 3172,633, Allen; 3,186,672, Weeder; 3,259,349, Lee.

Detachable rearview mirrors tend inherently to be subject to annoying vibration owing to the impermanent character of their attachment to the vehicle, and a great variety of bracing and stabilizing arrangements have been attempted in an effort to overcome such difficulties and increase the security as well as the rigidity of the temporary attachment.

When the mirror supporting means is of the tripodal or pivoted-thrust leg character some form of cross-bracing between the fixed legs of the array has been found desirable and is usually effected between the movable leg and other relatively stationary legs or frame parts. In one known form of this construction one or more cross braces are extended between the two fixed legs to extend in a direction which is generally parallel to the side of the fender skirt; and a diagonal brace is extended from some part of the structure to the pivotable leg and may involve an axial-telescoping and/or sliding interengagement with such pivotable leg, variants of this arrangement being seen in the cited patents.

In those cases in which the diagonal bracing is at all adjustable, the range of movement of the pivoted third leg may be objectionably limited, or difficult or inconvenient to effect, and the rigidifying effects may be insufficient.

In accordance with the present concept, a very rigid adjustable diagonal bracing is achieved by a clamping link between the pivoted leg and a convergent brace extending away from the side of the fender instead of parallel thereto into conjunction with the pivot of the third leg, with the upper end of the link slidable there-along and capable of a much greater and easier range of angular adjustment than is possible where the diagonal is attached to a cross brace extending laterally of the two fixed legs, as for example in the type of construction disclosed in the Lee Patent No. 3,259,349, wherein it is necessary to loosen four wing nuts and change the axial length of the diagonal turnbuckle in order to move the leg through its maximum possible range.

In the disclosed construction a tensioning means is also provided in the form of a screw hook at the bottom of the third leg which is easily turned up or loosened to set or release the device, the particular structural character and advantages of all such features being more fully described hereinafter in view of the annexed drawings in which:

FIGURE 1 is a fragmentary perspective view of an automobile body and the novel mirror structure mounted thereon;

FIGURE 2 is a perspective view of the mirror structure in a changed position detached from the vehicle;

FIGURE 3 is an enlarged fragmentary view of the tensioning hook on the third tripod leg or positioning leg;

FIGURE 3–A is an enlarged perspective detail of the tensioning hook;

FIGURE 4 is an enlarged exploded perspective of the slidable positioning link;

FIGURE 5 is an enlarged exploded detail of parts of the mirror and leg juncture with the legs shown fragmentally;

FIGURE 6 is an elevational view of the mirror structure illustrative of the adjustment of the positioning leg and link;

FIGURE 6–A is a view similar to FIGURE 6 but showing the pivotable leg and link in another position of adjustment;

FIGURE 7 is an enlarged elevational fragment of a modified form of attachment of the tensioning hook to the third leg.

As viewed in FIGURE 1, the mirror 10 is carried for adjustment at the upper end of a swing arm 11 of tubular stock, the lower end 12 of which is flattened and pierced to pass a retaining bolt 13, FIGURES 2 and 5, secured by a cap nut 14 (FIGURE 1) in assembly with the conjoined outer ends 16A, 17A, and 18A of three supporting legs 16, 17, and 18 which meet, with certain convergent brace parts to be described, in an apex juncture of a triangular arm.

At the opposite inner or free ends of the two stationary upper legs 16 and 17 are pivotally affixed metal hooks 16X and 17X adapted to seat at the margins 19A of the automobile fender 19 which confront the juxtaposed margins 15 of the hood, as in FIGURE 1, to be held down by the closed hood.

The two upper legs 16 and 17 are fixed to project into space in a manner not to rest upon the fender, and to this end a third point of support is provided at a lower level by the third leg 18 and a hook-shaped tensioning clamp 20 at the free end thereof, having the configuration seen in FIGURES 3 and 3–A, which engages beneath the rim 19B of the wheel opening in the fender and can be tightened to pull such leg securely into position to seize the fender at this point by tightening a wing nut 22 engaged with a carriage bolt 21 affixing the clamp to the flattened lower end 18B of the pivoted leg.

The secured end portion 23 of the tensioning hook, as seen in FIGURE 3–A is provided with an elongated bolt slot 23A to widen the range of pivotal movement of the hook and may have a moderate amount of curvature, as about the lateral axis 23X, to accentuate such pivotal movement when the wing nut is being tightened (or loosened) to cause the hook to rock upwardly (or downwardly) from one to another of the dotted-line positions shown in FIGURE 3 in tensioning or releasing said hook.

A pad 25 of cushioning material, shown fragmentally in FIGURE 3, may be secured by adhesive or the like to the flattened end portions of the leg 18 near the attachment of the hook to protect the fender finish in those adjustments of the hook in which it pulls the leg into touching proximity to the fender, which may or may not occur, depending upon the shape and size of the fender structure.

A rigidification of the mirror structure, and one which is very effective to reduce vibration, is achieved by application of a cross brace 30 to the two upper arms 16 and 17, said brace being preferably in the form of a tubing flattened at its opposite ends 30A, 30B, and provided intermediately with a median flat or land 31 affording a seat for the flattened end 36A of another tubular brace 36, the opposite flattened end 36B of which is conjoined at the apex juncture with the three supporting legs and the mirror stem joined by the bolt 13, and accordingly referred to for identification as the "convergent brace."

The two outer ends 30A, 30B of the cross brace are permanently secured, as by rivets 32 to intermediate lands or flats 16F and 17F, respectively, on the pair of upper legs, while the inner end 36A of the convergent brace is rigidly affixed in place, by means such as riveting 37, on the median land 31 of the cross brace.

Thus, it will appear that the bracing members 30 and 36 are joined together at 37 in a T-shaped configuration which is rigidly attached to the two relatively stationary upper legs 16 and 17, and in effect convergent and rigidly conjoined with the common juncture of all three legs and the mirror stem at the point of engagement and joinder by the bolt mean 13.

Whereas it is known in prior mirror structure of the class described to include various forms of additional bracing connections between the third or lower body-engaging leg and some part of the relatively fixed upper legs, for example by means of a cross brace, as the U.S. Patent No. 3,259,349 to Lee, many such prior third-leg bracing arrangements have limited range of adjustment and may not be conveniently adaptable to all sizes and shapes of fender and body configuration; or, movable bracing elements attaching to the third leg may not be shiftable to stand away from contact with the fender in all attitudes of adjustment.

In accordance with the present improvements, the means for adjustably locating the third leg comprises the provision of a pivoted diagonal link 40, FIGURE 1, of a form depicted in FIGURE 4, which is slidably engaged with the convergent brace and the third leg in such manner that the link, and therefore the leg, has a great range of adjustable angular and sliding displacement in the directions outwardly and inwardly of the side of the fender, that is, in a vertical plane which is at right angles to the length of the fender and car.

As viewed in FIGURE 4, the link 40 comprises a length of tube flattened and pierced at its opposite ends 40A, 40B to pass bolts 41A, 41B respectively by which the complementary sets of clamp jaws 42A and 42B respectively engage with corresponding ends of the link to be tightened by corresponding wing nuts 43A and 43B.

As in FIGURES 1 and 2, the upper end of the link is slidably connected with the convergent brace 36 by engagement of the clamp jaws 42A therewith, while the lower end of said link is likewise slidably engaged with the third leg 18 by the corresponding clamp jaws 42B.

By loosening the wing nuts 43A and 43B, the third leg 18 may be grasped with one hand, as in FIGURE 6, and pivoted back and forth toward and away from the fender 19, as indicated by dotted lines, to locate the tensioning hook 20 appropriately in proximity to the margin or rim 19R of the wheel opening, as required in each instance by the particular shape and size of the fender, and when the proper position is reached the wing nuts on the link ends are tightened and the hook 20 is rocked into seizure with said fender edge or rim portion 19R, as depicted in FIGURE 3 particularly, by turning in the wing nut 22.

Depending upon the angle between the third leg 18 and the sidewall or skirt of the fender and the location of the wheel opening rim 19R, the hook 20 will tend to seize with the inner side portions of the fender at different angles and locations, as is illustrated by the differences between the full-line position of the free end region 20F of the hook as compared with the upper dotted-line position thereof at 20F', which may be assumed to represent for illustrative purposes the possible conditions which might exist with a different shape or size of fender.

In FIGURE 3 another dotted-line position of the hook at 20F" depicts the dropping of the hook by gravitation when the tensioning nut 22 is fully loosened so that the upper attached hook end 23 can rock freely on the bolt 21. The construction of the tensioning hook shown in FIGURES 1 through 3 affords a powerful clamping means operative to put the entire mirror structure under tension in secure and relatively vibration-free attachment to the automobile.

A modified form of the tensioning means is shown in FIGURE 7 wherein the lower end portion 18X of the third leg, is deformed by rolled crimping or the like, as at 18Y to seize the head of a bolt 50 equipped with a tensioning wing nut 51 to capture the perforate upper end 55 of the tensioning hook or claw 54 provided with an enlarged hole 56 which permits it to rock upwardly or downwardly responsive to loosening and tightening of the wing nut, whereby the curved body of this hood can be forced into seizure with the edge of the wheel opening in a manner similar to that described for the embodiment of FIGURES 1 to 3, with the difference that while both embodiments have an approximately linear component (i.e., along the length of the bolt) as well as an angular or rocking component (about a center approximately in or at the bolt), the resultant clamping movements in each case tend to be different in the respect that with the disposition of the more nearly upward bolt or screw axis in FIGURE 7, the lower end of the pivotable third leg 18' tends to stand farther away from the fender, whereas in the arrangement of FIGURE 3 the lower end of the leg 18 has a tendency to move in against the fender, and in some installations with such force that buffer means such as the pad 25 is highly desirable. The main body of each form of the hook is provided with a dip coating 24 of rubber or like cushioning material, and such coating may be similarly provided on the head of the bolt 21 and flat on the lower end of leg 18, if desired.

The range of sliding adjustment of the link along the slideway is quite extensive in the constructions of FIGURES 1 and 2, but can be made even greater by locating the cross brace 30 closer to the inner, hood-engaging ends 16X and 17X, as indicated at 30X and lengthening the slide member 36 accordingly, in FIGURE 6-A, the latter showing a marked change in angular attitude and location of the link over the positions depicted in FIGURE 6.

I claim:
1. A rearview mirror structure of the tripodal type having three legs joined at corresponding ends in a convergent juncture defining a triangular array with means at the respective opposite ends of each leg adapted for attaching engagement thereof to spaced-apart marginal portions of a vehicle body, for example marginal portions of an automobile hood and adjacent margins of a fender wheel opening, two of said legs being joined at points relatively away from said juncture in a relatively fixed relationship while the third leg is pivotable relative to the others at said juncture, wherein the improvement resides in the provision of an elongated convergent brace having one end attached in the array at said juncture, and an opposite end extending substantially in a reference plane containing the two fixed legs and means rigidly securing said opposite end of the convergent brace in fixed relation to the other two fixed legs and substantially in said plane; together with an elongated, rigid adjusting link and first means pivotally and slidably connecting one end thereof with said convergent brace to slide in a direction along the length thereof, and pivot relative thereto, and second means at the opposite end of said link pivotally and slidably connecting the same with said third pivotable leg to slide in a direction along the length thereof and pivot relative thereto; and means for each said first and second means for respectively releasably clamping each of the same in positions of adjustment relative to said convergent brace and pivotable leg to secure the latter in adjusted positions relative to the two fixed legs; and means movably attaching a mirror device to the array at said juncture.

2. A construction according to claim 1 wherein the vehicle engagement means at the opposite end of the third and pivotable one of the legs comprises a screw-actuated and released clamp means adapted to engage with the rim portion of said wheel opening and operable to draw the third leg into position to tension the array in attachment to said vehicle.

3. A construction according to claim 1 wherein said means for attaching the opposite end of the convergent brace in fixed relation to the said other two fixed legs comprises an elongated cross brace rigidly joined at each of its opposite ends with one of said other two legs and at points between the respective ends thereof and said opposite fixed end of the convergent brace is rigidly attached to said cross brace at a point between the points of attachment thereof to said two legs, the said two legs, cross brace and convergent brace all being substantially contained in said reference plane.

4. The construction of claim 1 wherein said first and second means each comprise a screw-set and released clamping jaw means respectively slidably fitting upon the convergent brace and the pivotable third leg as set forth, said link being pivotably connected at each of its opposite ends with one of said clamping jaw means.

5. The construction of claim 1 wherein said means movably attaching the mirror device to the array comprises a tubular member and means attaching said mirror device in position at one end thereof, the opposite end of the tubular member being pivotally secured in assembly with said juncture of the array.

6. In a mirror support of the class having three legs joined in an angular array at corresponding ends in a conjunction from which they project divergently in the manner of a tripod, at least one of the legs being pivotable relative to the other two, and mirror means being carried in adjacency to said conjunction, the combination therewith of: an elongated convergent brace member and means securing the same in said array in a position between two of the legs with respect to which the third leg is pivotable as aforesaid, said brace being disposed in substantially equiangular relationship to the said two legs to lie in a common plane of reference therewith and extend in a direction of convergence toward said conjunction; and means for adjustably maintaining the third leg in desired pivotal positions including an elongated link, a first clampable means engaging said convergent brace for movement when not clamped to shift back and forth in a direction along the length thereof toward and away from said conjunction; a second clampable means engaging the third and pivotable one of said legs for movement when not clamped to shift back and forth in a direction along the length thereof toward and away from said conjunction, and means respectively pivotally connecting each of the opposite end regions of said link to a different one of said first and second clampable means, whereby in the unclamped condition of the clampable means the link has both angular and linear freedoms of motion and the third leg is free for pivotable adjustment back and forth relative to the other two legs for movement to desired positions in which it may be fixed by the clampable means in the clamped condition thereof, said link having only freedom of angular motion when the clampable means associated as aforesaid with the convergent brace is in clamped condition, and the clampable means associated with the third leg is in unclamped condition.

7. The combination according to claim 6 wherein the clamping action of the clampable means in each instance affects both the shiftability thereof and the pivotability of the respective connections thereof to the appertaining end regions of the link, so that in the unclamped condition thereof both shiftability and pivotability are permitted thereby, and in the clamped condition thereof both shiftability and pivotability are restrained.

References Cited

UNITED STATES PATENTS

| | | | |
|---|---|---|---|
| 2,898,070 | 8/1959 | De Vaan | 248—226 |
| 3,081,057 | 3/1963 | Farnsworth | 248—226 X |
| 3,114,530 | 12/1963 | Shilling | 248—226 |
| 3,119,591 | 1/1964 | Malecki | 248—282 |
| 3,172,633 | 3/1965 | Allen | 248—226 |
| 3,259,349 | 7/1966 | Lee | 248—485 X |

ROY D. FRAZIER, *Primary Examiner.*

FRANK DOMOTOR, *Assistant Examiner.*

U.S. Cl. X.R.

248—226